United States Patent
Kuo et al.

(10) Patent No.: US 12,045,970 B2
(45) Date of Patent: Jul. 23, 2024

(54) METHOD FOR DETECTING DEFECTS IN PRODUCT AND COMPUTER DEVICE

(71) Applicant: HON HAI PRECISION INDUSTRY CO., LTD., New Taipei (TW)

(72) Inventors: Chin-Pin Kuo, New Taipei (TW); Wei-Chun Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 395 days.

(21) Appl. No.: 17/561,821

(22) Filed: Dec. 24, 2021

(65) Prior Publication Data

US 2022/0207706 A1   Jun. 30, 2022

(30) Foreign Application Priority Data

Dec. 29, 2020 (CN) .......................... 202011599668.4

(51) Int. Cl.
*G06T 7/00* (2017.01)
*G01N 21/88* (2006.01)
*G06T 7/11* (2017.01)

(52) U.S. Cl.
CPC ....... *G06T 7/0004* (2013.01); *G01N 21/8851* (2013.01); *G06T 7/11* (2017.01); *G01N 2021/8887* (2013.01); *G06T 2207/20021* (2013.01); *G06T 2207/20081* (2013.01); *G06T 2207/30108* (2013.01)

(58) Field of Classification Search
CPC .................................................. G01N 21/8851
See application file for complete search history.

(56) References Cited

U.S. PATENT DOCUMENTS

| 11,064,204 B2 * | 7/2021 | Brice ................... H04N 19/159 |
| 2022/0189003 A1 * | 6/2022 | Ishii ..................... H04N 1/6097 |
| 2022/0207706 A1 * | 6/2022 | Kuo .................... G01N 21/8851 |

* cited by examiner

*Primary Examiner* — Edward Park
(74) *Attorney, Agent, or Firm* — ScienBiziP, P.C.

(57) ABSTRACT

A method for detecting defects in product applied in a computer device inputs an image of a product under test to an automatic encoder to obtain a reconstructed image, and the image is segmented into N image blocks and the reconstructed image is segmented into N image blocks. The computer device associates each of the N testing blocks with one reconstructed blocks according to positions of the N testing blocks in the image and positions of the N reconstructed blocks in the reconstructed image. The computer device further calculates mean square errors between each of the N testing blocks and each of the N reconstructed blocks, and associates each mean square error with each of the N testing blocks, whether the product has defects being determined based on the mean square errors corresponding to each of the N testing blocks.

20 Claims, 4 Drawing Sheets

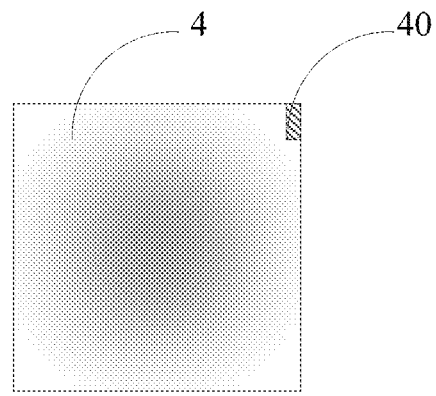 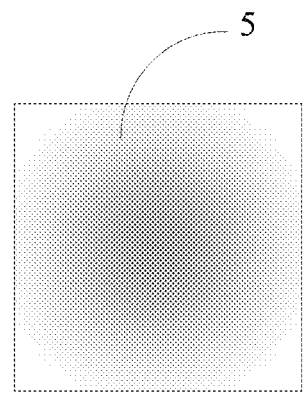
FIG.4A　　　　　　　　　　　　FIG.4B
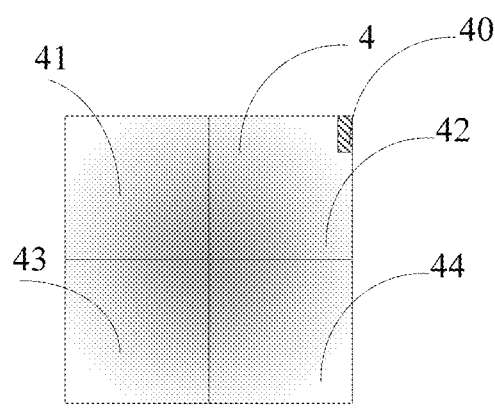 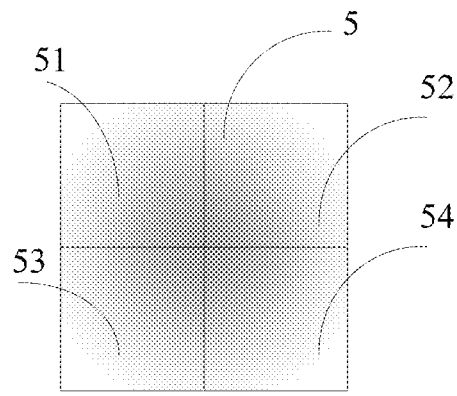
FIG.4C　　　　　　　　　　　　FIG.4D

METHOD FOR DETECTING DEFECTS IN PRODUCT AND COMPUTER DEVICE

CROSS-REFERENCE TO RELATED APPLICATIONS

This application claims priority to Chinese Patent Application No. 202011599668.4 filed on Dec. 29, 2020, in the China Intellectual Property Administration, the contents of which are incorporated by reference herein.

FIELD

The present disclosure relates to quality control field, in particular to a method for detecting defects in product, and a computer device.

BACKGROUND

In prior art, defects of a product can be detected based on images of the product. However, sometime products have minor defects or defects which are only revealed in certain positions, which makes it difficult to identify such defects. Therefore, an accuracy in detecting these defects may not be high.

BRIEF DESCRIPTION OF THE DRAWINGS

FIG. 4A shows a schematic diagram of an image of a product under test.

FIG. 4B shows a schematic diagram of a reconstructed image of the present disclosure.

FIG. 4C shows a schematic diagram of the segmenting the image of the FIG. 4A into blocks.

FIG. 4D shows a schematic diagram of segmenting the reconstructed image of the FIG. 4B into blocks.

DETAILED DESCRIPTION

In order to provide a clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
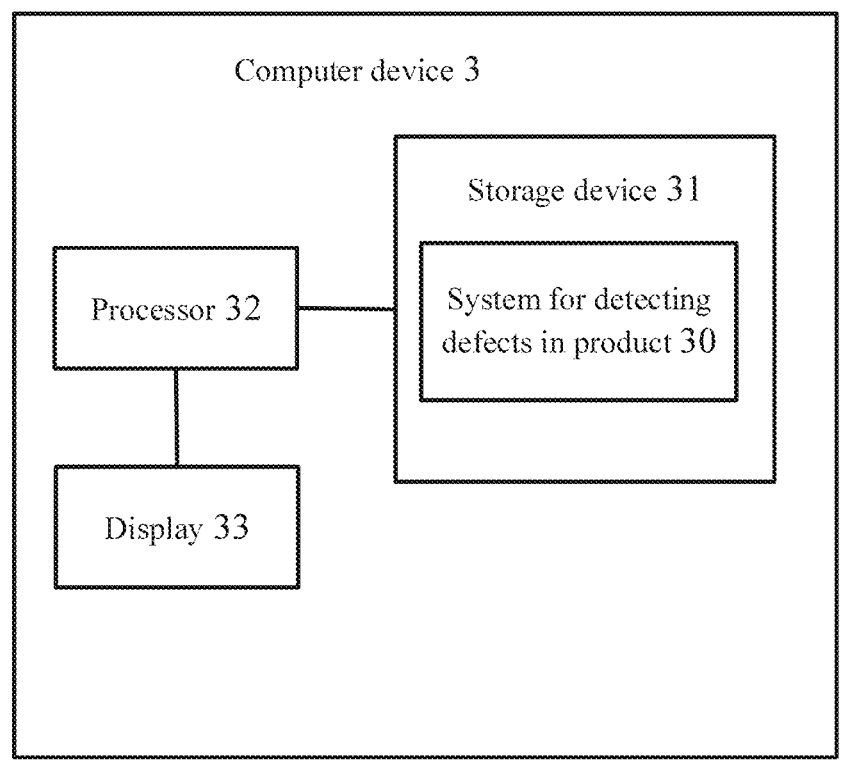
FIG. 1 illustrates a schematic diagram of a computer device according to one embodiment of the present disclosure.

FIG. 1 illustrates a schematic diagram of a computer device of the present disclosure.

In at least one embodiment, the computer device 3 includes a storage device 31, at least one processor 32, and a display 33. The storage device 31, the at least one processor 32, and the display 33 are in electrical communication with each other.

Those skilled in the art should understand that the structure of the computer device 3 shown in FIG. 1 does not constitute a limitation of the embodiment of the present disclosure. The computer device 3 can further include more or less other hardware or software than that shown in FIG. 1, or the computer device 3 can have different component arrangements.

It should be noted that the computer device 3 is merely an example. If another kind of computer device can be adapted to the present disclosure, it is also to be included in the protection scope of the present disclosure, and incorporated herein by reference In some embodiments, the storage device 31 may be used to store program codes and various data of computer programs. For example, the storage device 31 may be used to store a system 30 for detecting defects in product installed in the computer device 3 and implement completion of storing programs or data during an operation of the computer device 3. The storage device 31 may include Read-Only Memory (ROM), Programmable Read-Only Memory (PROM), and Erasable Programmable Read-Only Memory (EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different functions. The at least one processor 32 includes one or more central processing units (CPUs), one or more microprocessors, one or more digital processing chips, one or more graphics processors, and various control chips. The at least one processor 32 is a control unit of the computer device 3. The at least one processor 32 uses various interfaces and lines to connect various components of the computer device 3, and executes programs or modules or instructions stored in the storage device 31, and invokes data stored in the storage device 31 to perform various functions of the computer device 3 and to process data, for example, perform a function of processing files, such as encrypting files and decrypting encrypted files (for details, see the description of FIG. 3).

In this embodiment, the system 30 for detecting defects in product can include one or more modules. The one or more modules are stored in the storage device 31 and are executed by at least one processor (e.g., processor 32 in this embodiment), such that a function of detecting defects in product (for details, see the introduction to FIG. 3) is achieved.

Figure 2:
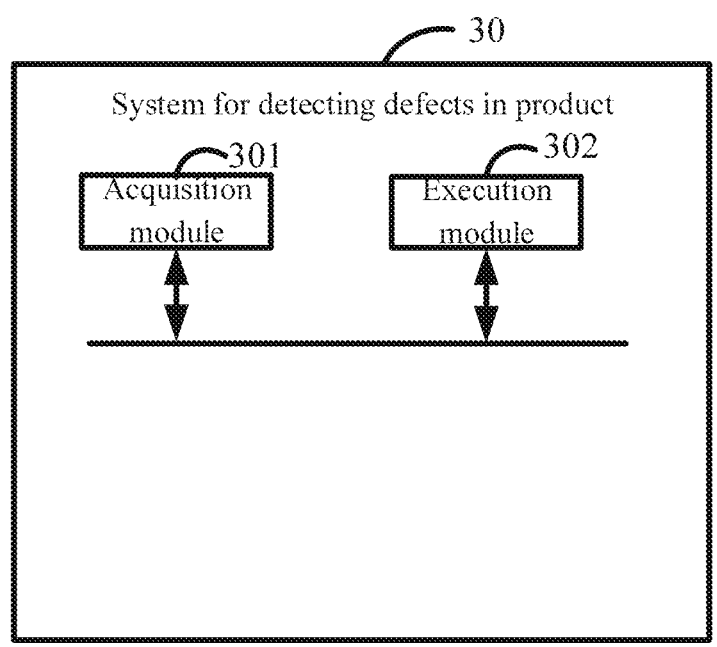
FIG. 2 shows one embodiment of modules of a system for detecting defects in product of the present disclosure.

In this embodiment, the system 30 can include a plurality of modules. Referring to FIG. 2, the plurality of modules includes an acquisition module 301, and an execution module 302. The modules referred to in the present disclosure refer to a series of computer-readable instructions that can be executed by at least one processor (for example, the processor 32), and can complete functions, and can be stored in a storage device (for example, the storage device 31 of the computer device 3). In this embodiment, functions of each module will be described in detail with reference to FIG. 3.

Figure 3:
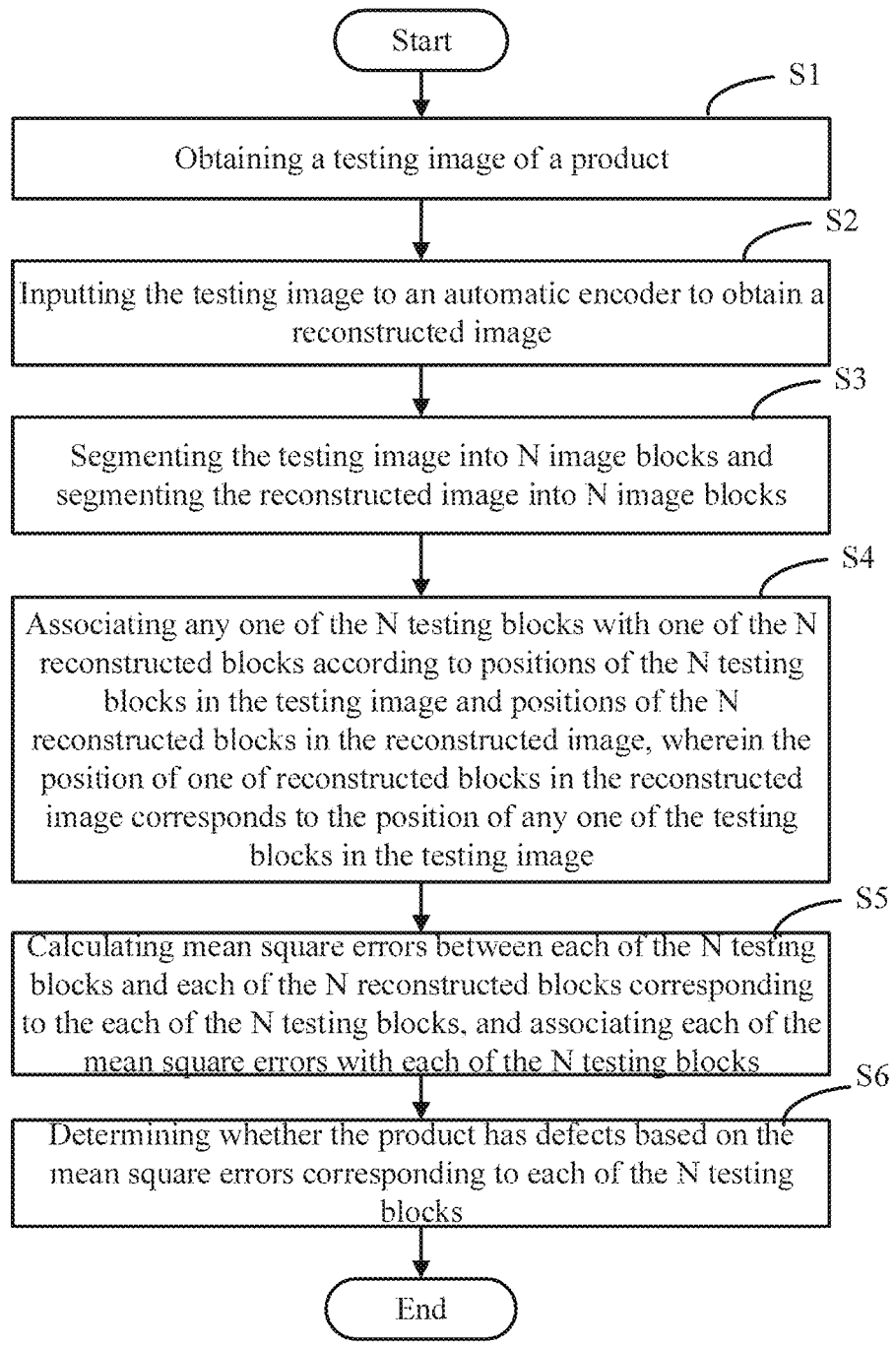
FIG. 3 shows a first flow chart of one embodiment of a method for detecting defects in product according to the present disclosure.

In this embodiment, an integrated unit implemented in a form of a software module can be stored in a non-transitory readable storage medium. The above modules include one or more computer-readable instructions. The computer device 3 or a processor implements the one or more computer-readable instructions, such that the method for detecting defects in product, as shown in FIG. 3, is achieved.

In a further embodiment, referring to FIG. 2, the at least one processor 32 can execute an operating system of the computer device 3, various types of applications (such as the data protection system 30 described above), program codes, and the like.

In a further embodiment, the storage device 31 stores program codes of a computer program, and the at least one processor 32 can invoke the program codes stored in the storage device 31 to achieve related functions. For example, each module of the system 30 shown in FIG. 2 is program code stored in the storage device 31. Each module of the system 30 shown in FIG. 2 is executed by the at least one processor 32, such that the functions of the modules are achieved, and the purpose of detecting defects in product (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of detecting defects in product. Specifically, the computer-readable instructions executed by the at least one processor 32 enable the purpose of detecting defects in product described to be achieved.

It should be noted that, in other embodiments, the system 30 may also be implemented as an embedded system with a storage device, a processor, and other necessary hardware or software.

FIG. 3 is a first flowchart of a method for detecting defects in product according to a preferred embodiment of the present disclosure.

In this embodiment, the method for detecting defects in product can be applied to the computer device 3. For the computer device 3 used to detect defects in product, the computer device 3 can be directly integrated with the function of detecting defects in product. The computer device 3 can also achieve the function of detecting defects in product by running a Software Development Kit (SDK).

FIG. 3 shows a first flow chart of one embodiment of a method for detecting defects in product. Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the acquisition module 301 obtains an image of a product to be detected (In order to clearly and simply explain the disclosure, the image of the product to be detected is hereinafter referred to as "testing image").

In one embodiment, the product is the product that may have defects. For example, the product can be a mobile phone case, a mobile phone protective sleeve, or any other suitable product.

In one embodiment, the acquisition module 301 can capture the product to be detected by a camera (not shown in the figure) to obtain the testing image of the product to be detected. In one embodiment, the testing image of the product to be detected can also be stored in the storage device 31 in advance, and the acquisition module 301 can directly obtain the testing image of the product from the storage device 31.

For example, the acquisition module 301 can obtain the testing image (referring to FIG. 4A). In this disclosure, all products unless expressly excepted have defects and testing image includes defects 40.

At block S2, the execution module 302 inputs the testing image to an automatic encoder (AE) to obtain a reconstructed image.

It should be noted that the automatic encoder is a neural network that uses a back propagation algorithm to make an output value of the automatic encoder equal to an input value of the automatic encoder. In one embodiment, the automatic encoder includes an encoder and a decoder. The encoder can compress the input value into potential spatial representation, and the decoder can reconstruct the potential spatial representation and output a reconstructed result.

In one embodiment, before inputting the testing image to the automatic encoder, the execution module 302 trains the automatic encoder with a number of sample images, wherein each sample image in the number of sample images is an image taken of a perfect product, when the product does not have defects.

For example, the execution module 302 inputs the testing image 4 to the automatic encoder and the automatic encoder outputs the reconstructed image (referring to FIG. 4B).

At block S3, the execution module 302 segments the testing image into N image blocks and segments the reconstructed image into N image blocks.

In one embodiment, N is a positive integer, and N is greater than or equal to 2.

In order to clearly and simply explain the present disclosure, each segmented image block of the test image is called "testing block", and each segmented image block of the reconstructed image is called "reconstructed block".

In one embodiment, the execution module 302 segments the testing image into the N testing blocks according to a preset segmenting rules, and segments the reconstructed image into the N reconstructed blocks according to the preset segmenting rule. In one embodiment, the N testing blocks are equal in size, and the N reconstructed blocks are equal in size.

In one embodiment, the preset segmenting rule refers to segmenting a target image along a first center line of the target image, where the first center line is a center line between a top edge and a bottom edge of the target image; and/or segmenting the target image along a second center line of the target image, where the second center line is a center line corresponding to a left edge and a right edge of the target image. The target image refers to the testing image or to the reconstructed image.

In one embodiment, the execution module 302 segments the target image along the first center line of the target image (i.e., the testing image or the reconstructed image); and segments the target image along the second center line of the target image.

For example, referring to FIG. 4C, the execution module 302 segments the testing image 4 along the first center line of the testing image 4; and segments the testing image 4 along the second center line of the testing image 4, the testing image 4 is thus divided into four test blocks 41, 42, 43, and 44. Referring to FIG. 4D, the execution module 302 segments the reconstructed image 5 along the first center line of the reconstructed image 5; and segments the reconstructed image 5 along the second center line of the reconstructed image 5, and divides the reconstructed image 5 into four reconstructed blocks 51, 52, 53, and 54.

In one embodiment, the execution module 302 segments the target image according to other segmenting rules.

For example, the execution module 302 can segment the target image into three image blocks or other number with equal size along a transverse direction of the target image.

At block S4, the execution module 302 associates any one of the N testing blocks with one of the N reconstructed blocks according to positions of the N testing blocks in the testing image and positions of the N reconstructed blocks in the reconstructed image, where the position of the one of the reconstructed blocks in the reconstructed image corresponds to the position of any one of the testing blocks in the testing image.

For example, the execution module 302 associates the testing block 41 with the reconstructed block 51 corresponding to the testing block 41 in positions according to the respective positions of the four testing blocks 41, 42, 43, and 44 in the testing image 4 and the respective positions of the four reconstruction blocks 51, 52, 53, and 54 in the reconstructed image 5. The testing block 42 is associated with the reconstructed block 51 corresponding to the testing block 42 in position, associates the testing block 43 with the reconstructed block 53 corresponding to the testing block 43 in position, and associates the testing block 44 with the reconstructed block 54 corresponding to the testing block 43 in position.

At block S5, the execution module 302 calculates mean square errors (MSE) between each of the N testing blocks and each of the N reconstructed blocks corresponding to the each of the N testing blocks, and associates each of the mean square errors with each of the N testing blocks.

For example, the execution module 302 calculates a first MSE between the testing block 41 and the reconstructed block 51 as MSE1, calculates a second MSE between the testing block 42 and the reconstructed block 52 as MSE2. Then the MSE1 is associated with the testing block 41, and the MSE2 is associated with the testing block 42.

At block S6, the execution module 302 determines whether the product has defects based on the MSEs corresponding to each of the N testing blocks.

In one embodiment, determining whether the product has defects based on the MSEs corresponding to each of the N testing blocks includes:

(a1) determining whether each MSE corresponding to each of the N testing blocks is greater than a default value for example, the default value being 0.001;

(a2) when any one MSE corresponding to each of the N testing blocks is greater than the default value, determining that such testing block is a defective block;

(a3) when the N testing blocks includes at least one defective block, determining that the product has defects;

(a4) when the N testing blocks do not include defective block, determining that the product does not have defects.

In one embodiment, assuming that MSE2 corresponding to the testing block 42 is 0.1, that is, greater than the default value of 0.001, the execution module 302 determines that the testing block 42 is a defective block.

In one embodiment, when determining that the product has defects, the execution module 302 marks the defective block on the testing image according to a position of the defective block in the testing image, so as to obtain a marked testing image and displays the marked testing image on the display.

In one embodiment, the execution module 302 displays the reconstructed blocks corresponding to the defective block in response to user's specified operation on the testing image. Thus, it is convenient for users to compare and view the defects of the product.

In one embodiment, marking the defective block on the testing image includes infilling area occupied by the defective block on the testing image with a preset color, such as red; or generating an arrow icon, and pointing the arrow icon to the position of the defective block on the testing image.

In one embodiment, user's specified operation on the testing image refers to an input operation at any position of the testing image, or can refer to the input operation at the location of the marked defective block. In one embodiment, the input operation can refer to a long press/double click operation.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for detecting defects in product comprising:
   obtaining a testing image of a product;
   inputting the testing image to an automatic encoder and obtaining a reconstructed image;
   segmenting the testing image into N image blocks and segmenting the reconstructed image into N image blocks;
   associating any one of N testing blocks with one of N reconstructed blocks according to positions of the N testing blocks in the testing image and positions of the N reconstructed blocks in the reconstructed image, the position of one of reconstructed blocks in the reconstructed image corresponding to the position of any one of the testing blocks in the testing image;
   calculating mean square errors between each of the N testing blocks and each of the N reconstructed blocks corresponding to the each of the N testing blocks, and associating each of the mean square errors with each of the N testing blocks; and
   determining whether the product has defects based on the mean square errors corresponding to each of the N testing blocks.

2. The method for detecting defects in product according to claim 1, wherein determining whether the product has defects based on the mean square errors corresponding to each of the N testing blocks comprises:
   determining whether each of the mean square errors corresponding to each of the N testing blocks is greater than a default value;
   in response that any one of the mean square errors is greater than the default value, determining that the any one of the testing blocks is a defective block;

in response that the N testing blocks comprise at least one defective block, determining that the product has defects; and in response that the N testing blocks do not comprise defective block, determining that the product does not have defects.

3. The method for detecting defects in product according to claim 1, further comprising:

before inputting the testing image to the automatic encoder, training the automatic encoder with a plurality of sample images, wherein each of the plurality of sample images is an image of a product without any defects.

4. The method for detecting defects in product according to claim 1, further comprising:

in response that determining that the product has defects, marking the defective block on the test image according to a position of the defective block in the testing image, obtaining a marked testing image, and displaying the marked testing image on a display.

5. The method for detecting defects in product according to claim 4, further comprising:

displaying the reconstructed blocks corresponding to the defective block in response to user's specified operation on the testing image.

6. The method for detecting defects in product according to claim 1, further comprising:

segmenting the testing image into the N testing blocks according to a preset segmenting rules, and segmenting the reconstructed image into the N reconstructed blocks according to the preset segmenting rule, wherein the N testing blocks are equal in size, and the N reconstructed blocks are equal in size.

7. The method for detecting defects in product according to claim 6, wherein the preset segmenting rule comprises:

segmenting a target image along a first center line of the target image, wherein the first center line is a center line between a top edge and a bottom edge of the target image; or segmenting the target image along a second center line of the target image, wherein the second center line is a center line corresponding to a left edge and a right edge of the target image, and the target image can be the testing image or the reconstructed image.

8. A computer device comprising:

a storage device;

at least one processor; and the storage device storing one or more programs, which when executed by the at least one processor, cause the at least one processor to:

obtain a testing image of a product;

input the testing image to an automatic encoder and obtain a reconstructed image;

segment the testing image into N image blocks and segment the reconstructed image into N image blocks;

associate any one of N testing blocks with one of N reconstructed blocks according to positions of the N testing blocks in the testing image and positions of the N reconstructed blocks in the reconstructed image, wherein the position of one of reconstructed blocks in the reconstructed image corresponds to the position of any one of the testing blocks in the testing image;

calculate mean square errors between each of the N testing blocks and each of the N reconstructed blocks corresponding to the each of the N testing blocks, and associate each of the mean square errors with each of the N testing blocks; and determine whether the product has defects based on the mean square errors corresponding to each of the N testing blocks.

9. The computer device according to claim 8, wherein the at least one processor is further caused to:

determine whether each of the mean square errors corresponding to each of the N testing blocks is greater than a default value;

in response that any one of the mean square errors is greater than the default value, determine that the any one of the testing blocks is a defective block;

in response that the N testing blocks includes at least one defective block, determine that the product has defects; and in response that the N testing blocks do not include defective block, determine that the product does not have defects.

10. The computer device according to claim 8, wherein the at least one processor is further caused to:

before inputting the testing image to the automatic encoder, train the automatic encoder with a plurality of sample images, wherein each of the plurality of sample images is an image of a product without any defects.

11. The computer device according to claim 8, wherein the at least one processor is further caused to:

in response that determining that the product has defects, mark the defective block on the test image according to a position of the defective block in the testing image, and obtain a marked testing image, and display the marked testing image on a display.

12. The computer device according to claim 11, wherein the at least one processor is further caused to:

display the reconstructed blocks corresponding to the defective block in response to user's specified operation on the testing image.

13. The computer device according to claim 8, wherein the at least one processor is further caused to:

segment the testing image into the N testing blocks according to a preset segmenting rules, and segment the reconstructed image into the N reconstructed blocks according to the preset segmenting rule, wherein the N testing blocks are equal in size, and the N reconstructed blocks are equal in size.

14. The computer device according to claim 13, wherein the at least one processor is further caused to:

segment a target image along to first center line of the target image, wherein the first center line is a center line between a top edge and a bottom edge of the target image; or segment the target image along a second center line of the target image, wherein the second center line is a center line corresponding to a left edge and a right edge of the target image, and the target image can be the testing image or the reconstructed image.

15. A non-transitory computer-readable storage medium having stored thereon instructions that, when executed by at least one processor of a computer device, causes the least one processor to execute instructions of a method for detecting defects in product, the method comprising: obtaining a testing image of a product; inputting the testing image to an automatic encoder and obtaining a reconstructed image; segmenting the testing image into N image blocks and segmenting the reconstructed image into N image blocks; associating any one of N testing blocks with one of N reconstructed blocks according to positions of the N testing blocks in the testing image and positions of the N reconstructed blocks in the reconstructed image, wherein the position of one of reconstructed blocks in the reconstructed image corresponds to the position of any one of the testing blocks in the testing image; calculating mean square errors between each of the N testing blocks and each of the N reconstructed blocks corresponding to the each of the N testing blocks, and associating each of the mean square errors with each of the N testing blocks; and determining whether the product has defects based on the mean square errors corresponding to each of the N testing blocks.

16. The non-transitory computer-readable storage medium as recited in claim 15, wherein the method comprising: determining whether each of the mean square errors corresponding to each of the N testing blocks is greater than a default value; in response that any one of the mean square errors is greater than the default value, determining that the any one of the testing blocks is a defective block; in response that the N testing blocks includes at least one defective block, determining that the product has defects; and in response that the N testing blocks do not include defective block, determining that the product does not have defects.

17. The non-transitory computer-readable storage medium as recited in claim 15, wherein the method comprising: before inputting the testing image to the automatic encoder, training the automatic encoder with a plurality of sample images, wherein each of the plurality of sample images is an image of a product without any defects.

18. The non-transitory computer-readable storage medium as recited in claim 15, wherein the method comprising: in response that determining that the product has defects, marking the defective block on the test image according to a position of the defective block in the testing image, and obtaining a marked testing image, and displaying the marked testing image on a display.

19. The non-transitory computer-readable storage medium as recited in claim 18, wherein the method comprising: displaying the reconstructed blocks corresponding to the defective block in response to user's specified operation on the testing image.

20. The non-transitory computer-readable storage medium as recited in claim 15, wherein the method comprising: segmenting the testing image into the N testing blocks according to a preset segmenting rules, and segmenting the reconstructed image into the N reconstructed blocks according to the preset segmenting rule, wherein the N testing blocks are equal in size, and the N reconstructed blocks are equal in size.

* * * * *